US 9,469,071 B2

(12) United States Patent
Douglass et al.

(10) Patent No.: US 9,469,071 B2
(45) Date of Patent: Oct. 18, 2016

(54) FUSED FILAMENT FABRICATION SYSTEM AND METHOD

(71) Applicants: Brian L. Douglass, Willman, MN (US); Carl R. Douglass, III, Willmar, MN (US)

(72) Inventors: Brian L. Douglass, Willman, MN (US); Carl R. Douglass, III, Willmar, MN (US)

(73) Assignee: Douglass Innovations, Inc., Spicer, MN (US)

( * ) Notice: Subject to any disclaimer, the term of this patent is extended or adjusted under 35 U.S.C. 154(b) by 96 days.

(21) Appl. No.: 14/447,763

(22) Filed: Jul. 31, 2014

(65) Prior Publication Data
US 2015/0037446 A1 Feb. 5, 2015

Related U.S. Application Data

(60) Provisional application No. 61/975,181, filed on Apr. 4, 2014, provisional application No. 61/861,206, filed on Aug. 1, 2013.

(51) Int. Cl.
*B29C 67/00* (2006.01)

(52) U.S. Cl.
CPC .................. *B29C 67/0055* (2013.01)

(58) Field of Classification Search
CPC .......... B29C 67/0055; B29C 67/0085; B29C 67/06; B29C 67/0051
See application file for complete search history.

(56) References Cited

U.S. PATENT DOCUMENTS

| | | | | |
|---|---|---|---|---|
| 5,121,329 A * | 6/1992 | Crump | .................... | B22F 3/115 228/180.5 |
| 5,816,466 A * | 10/1998 | Seufer | .................. | B23K 9/1333 226/187 |
| 6,041,991 A * | 3/2000 | Mehri | .................... | B65H 51/32 226/110 |
| 6,085,957 A * | 7/2000 | Zinniel | .................. | B65H 51/30 226/43 |
| 6,129,872 A * | 10/2000 | Jang | ........................ | B29C 41/36 264/245 |
| 6,685,866 B2 * | 2/2004 | Swanson | ................. | B29C 41/36 264/308 |

(Continued)

*Primary Examiner* — Yogendra Gupta
*Assistant Examiner* — Emmanuel S Luk
(74) *Attorney, Agent, or Firm* — Tarolli, Sundheim, Covell & Tummino LLP (57) ABSTRACT

A fused filament fabrication system and method comprises a motor for moving the system along a linear rail during operation, a drive gear coupled to the motor. The drive gear rotates in the direction of the motor during operation and selectively operatively engages first or second idler gears during operation of the system. The system also comprises first and second filaments for the selective passage of material to corresponding first and second extruders, the first filament is positioned between the first idler gear shaft and idler bearing and the second filament is positioned between the second idler gear shaft and idler bearing.

17 Claims, 8 Drawing Sheets

(56) References Cited

U.S. PATENT DOCUMENTS

| | | | |
|---|---|---|---|
| 7,604,470 B2 | 10/2009 | LaBossiere et al. | |
| 8,647,102 B2 * | 2/2014 | Swanson | B29C 41/52 425/162 |
| 8,827,684 B1 * | 9/2014 | Schumacher | B29C 67/0085 264/308 |
| 9,050,753 B2 * | 6/2015 | Rodgers | B29C 67/0055 |
| 2007/0228590 A1 * | 10/2007 | LaBossiere | B29C 67/0055 264/40.1 |
| 2009/0035405 A1 * | 2/2009 | Leavitt | B29C 47/0021 425/97 |
| 2009/0295032 A1 * | 12/2009 | Hopkins | B29C 67/0055 264/308 |
| 2012/0189729 A1 * | 7/2012 | Pax | B29C 67/0055 425/378.1 |
| 2013/0164960 A1 * | 6/2013 | Swanson | B29C 67/0055 439/199 |
| 2014/0159273 A1 * | 6/2014 | Koop | B65H 51/10 264/129 |
| 2014/0263534 A1 * | 9/2014 | Post | B29C 47/12 226/196.1 |
| 2015/0037446 A1 * | 2/2015 | Douglass | B29C 67/0055 425/131.1 |
| 2015/0084222 A1 * | 3/2015 | Heston | B29C 47/003 264/40.7 |

* cited by examiner

FUSED FILAMENT FABRICATION SYSTEM AND METHOD

CROSS REFERENCES TO RELATED APPLICATIONS

The following application claims priority to U.S. Provisional Patent Application Ser. No. 61/861,206 filed Aug. 1, 2013 entitled FUSED DEPOSITION MODELING SYSTEM AND METHOD and U.S. Provisional Patent Application Ser. No. 61/975,181 filed Apr. 4, 2014 entitled FUSED DEPOSITION MODELING SYSTEM AND METHOD. The above-identified applications are incorporated herein by reference in their entireties for all purposes.

TECHNICAL FIELD

The present disclosure relates generally to a fused filament fabrication modeling system and method of operation, and more specifically, a fused filament fabrication modeling system that includes a novel compact construction that reduces the overall footprint of the system and improves the overall quality/operation during use.

BACKGROUND

Fused Filament Fabrication (FFF) is the technology of extruding plastic through a nozzle to form physical models. The physical models formed by FFF may be used for functional prototype testing, for reviewing fit and function of physical parts, or in low volume production scenarios. FFF allows for physical parts to be created quickly and without the construction of costly tooling (in the case of Injection molding for example). FFF is also referred to as Additive Manufacturing or 3d Printing, and most generally as rapid prototyping. Further discussion of conventional FFF designs and methods of operation are found in U.S. Pat. No. 7,604,470 that issued on Oct. 29, 2009 assigned to Stratasys, Inc. The contents of U.S. Pat. No. 7,604,470 are incorporated herein by reference in its entirety.

Among many of the benefits of FFF is the ability to extrude a number of different plastic materials with different extrusion nozzles. The ability to extrude different plastics allows for the selection and use of plastic based on the physical or mechanical properties which are selected based on the products finished application. Additionally, the use of different sized nozzles allows for physical models to be created with very fine detail, using a very small nozzle; or conversely for less detail and higher production speed using a larger nozzle.

The limitations with the multiple extrusion heads for FFF machines is that for each nozzle there is a stepper motor which drives the plastic filament through the heated nozzle. As more traditional extrusion nozzle/motor combinations are added, the footprint of the extrusion head grows which reduces the size of the physical model that can be created. This occurs because each nozzle must be able to reach the extents of the print area in the x-axis and y-axis directions.

SUMMARY

One example embodiment of the present disclosure includes a fused Filament Fabrication system and method comprises a motor for moving the system along a linear rail during operation, a drive gear coupled to the motor. The drive gear rotates in the direction of the motor during operation and selectively operatively engages either first or second idler gears during operation of the system. The system also comprises first and second filaments for the selective passage of material to corresponding first and second extruders, the first filament is positioned between the first idler gear shaft and idler bearing and the second filament is positioned between the second idler gear shaft and idler bearing.

Another aspect of the present disclosure includes a fused filament fabrication system comprising a drive gear coupling to a motor during operation, the drive gear selectively operatively engaging first or second idler gears during operation of the system, and first and second filaments for the selective passage of material to corresponding first and second extruders, the first filament being positioned between the first idler gear shaft and a first idler bearing and the second filament being positioned between the second idler gear shaft and a second idler bearing. The system during use dispensing material from the first filament when the first idler gear is engaged by the drive gear while the second filament remains free from dispensing, and the system during use dispensing material from the second filament when the second idler gear is engaged by the drive gear while the first filament remains free from dispensing.

While another aspect of the disclosure comprises a fused filament fabrication system comprising a drive gear coupling to a motor during operation, the drive gear selectively operatively engaging first or second sets of idler gears during operation of the system, first and second filaments for the selective passage of material to corresponding first and second extruders. The first filament being positioned between the first idler gear shaft and a first idler bearing and the second filament being positioned between the second idler gear shaft and a second idler bearing, and a latch coupled to an actuation device for selectively controlling the selective engagement and release of the first and second idler gears during the change of directional rotation of the drive gear such that retraction of material in the first and second filaments is controlled. The system during use dispensing material from the first filament when the first idler gear is engaged by the drive gear while the second filament remains free from dispensing, and the system during use dispensing material from the second filament when the second idler gear is engaged by the drive gear while the first filament remains free from dispensing.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Referring now to the figures wherein like numbered features shown therein refer to like elements throughout unless otherwise noted. The present disclosure relates generally to a fused filament fabrication system and method of operation, and more specifically, a fused filament fabrication system that includes a novel compact construction that reduces the overall footprint of the system and improves the overall quality/operation during use.

Referring again to the figures and in particular to FIGS. 2-6 is a passive FFF system 10 constructed in accordance with one example embodiment of the present disclosure. The FFF system 10 is constructed for the building of a thermoplastic 3D object from a CAD model in a layer by layer fashion. The FFF system 10 comprises a head assembly 12, first and second extruders 14, 16, stepper motor 18, and linear rail 20, and a latch 23 powered by a servo motor, actuator or other similar method of power actuation. In the current example embodiment, the latch 23 is driven by a servo motor 19. The stepper motor 18 drives the FFF system 10 on a carriage 21 back and forth along the linear rail 20 as the 3D object is formed from thermoplastic material that is advanced through first and second filaments 22, 24, respectively as the filaments are manipulated by the head assembly 12. The powered latch system 23, activates to prevent movement of the FFF system along the linear rail, 20 to permit a drive gear 31 to reverse direction and remain engaged with the idler gear 25 or 26 to allow for selective filament retraction. The latch system 23 advantageously prevents undesired dripping of material from a selected filament 22, 24 when the extruding of material is no longer desired.

The head assembly 12 comprises a first 25 and a second 26 idler gear that are driven by drive gear 31. The drive gear is coupled to the drive shaft 32 of the stepper motor 18. The idler gears 25, 26 are coupled to idler gear shafts 27, 28, which are immediately adjacent to filament idler bearings 29, 30. Filaments 22, 24 pass through idler gear shafts and idler bearings 27 and 29 as well as 28 and 30 respectively, into first and second extruders 14, 16.

Figure 1:
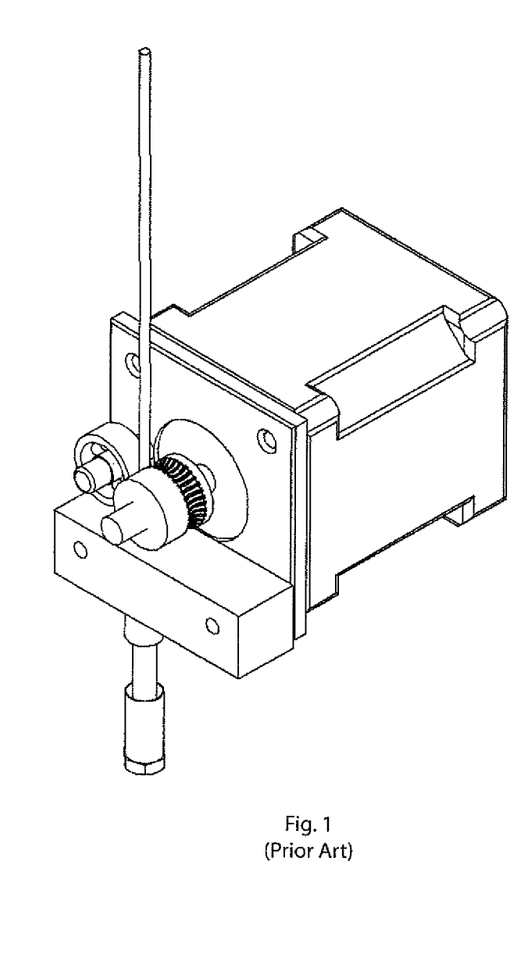
FIG. 1 is a front perspective view of a prior art FFF design.
Figure 2:
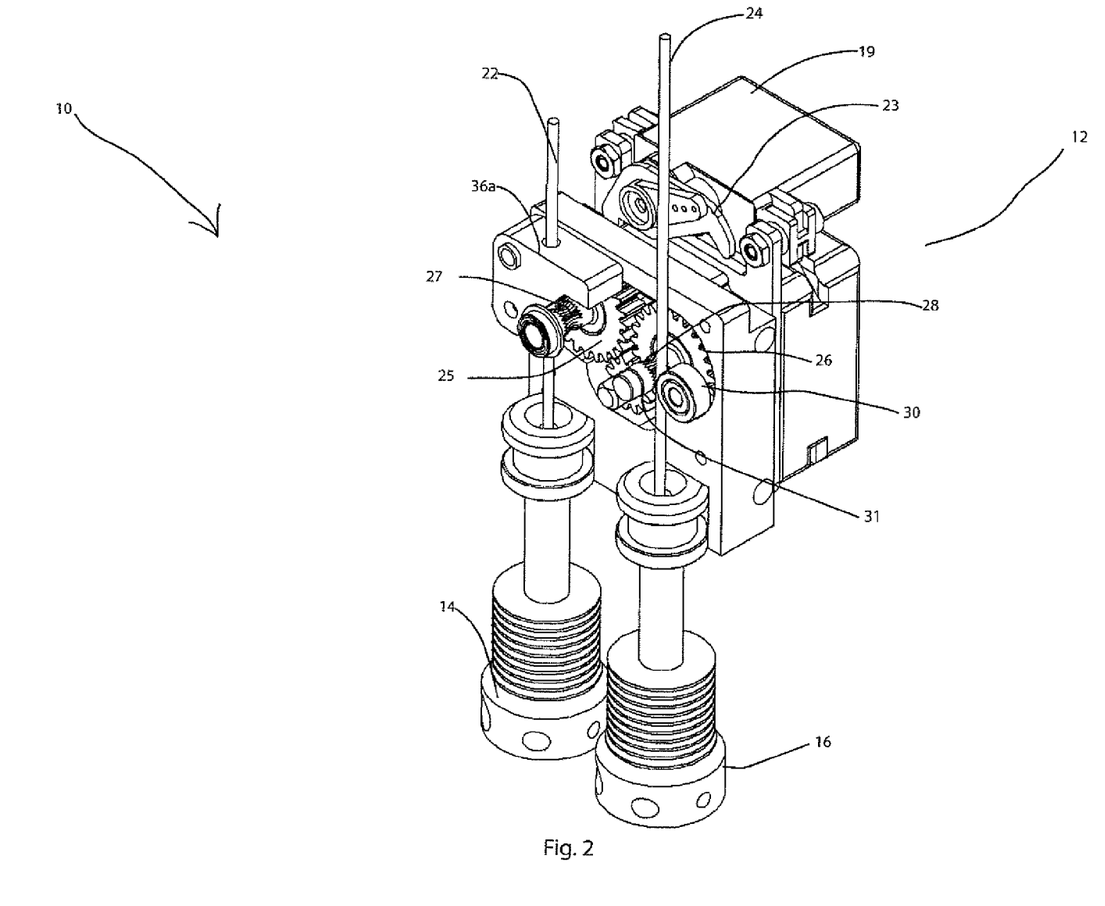
FIG. 2 is a front perspective view of a passive FFF system constructed in accordance with one example embodiment of the present disclosure.
Figure 3:
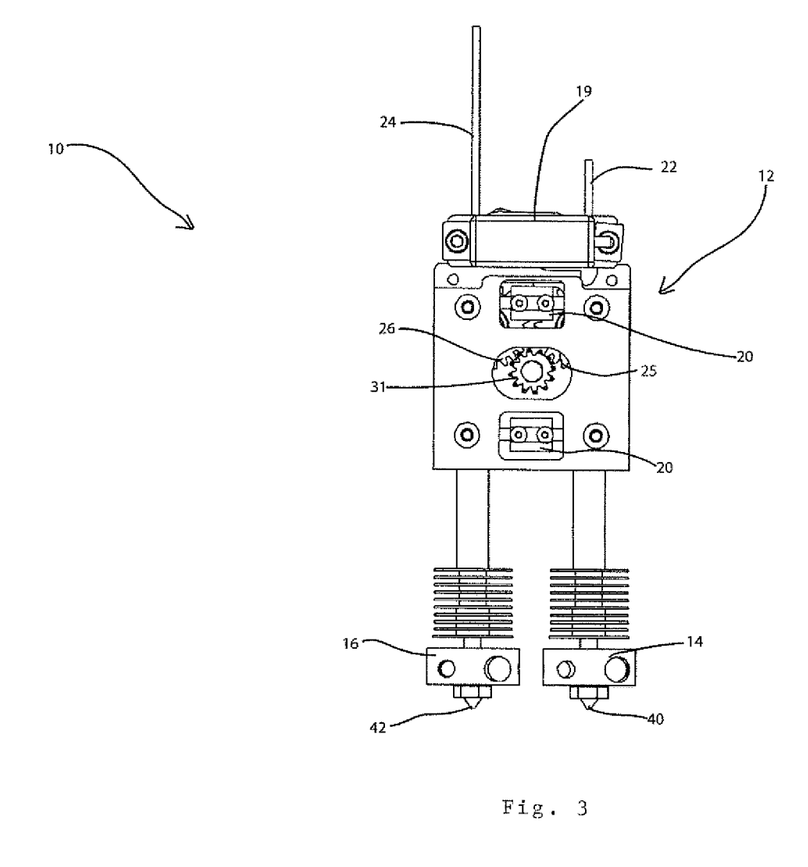
FIG. 3 is a back view of the system in FIG. 2.
Figure 4:
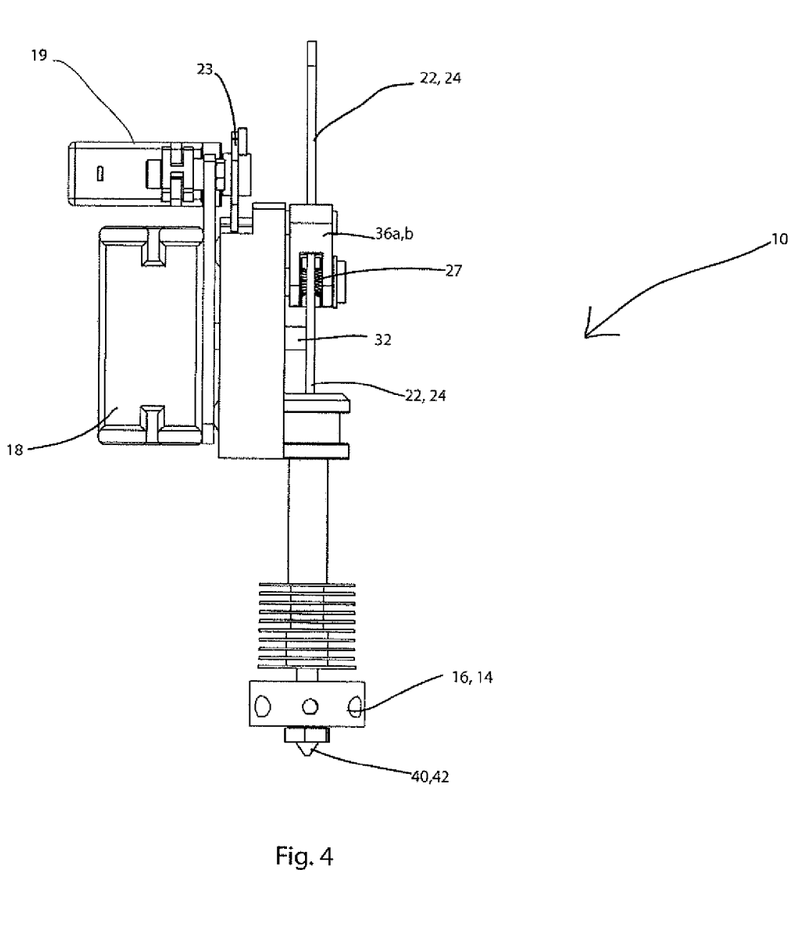
FIG. 4 is a side elevation view of the system in FIG. 2.
Figure 5:
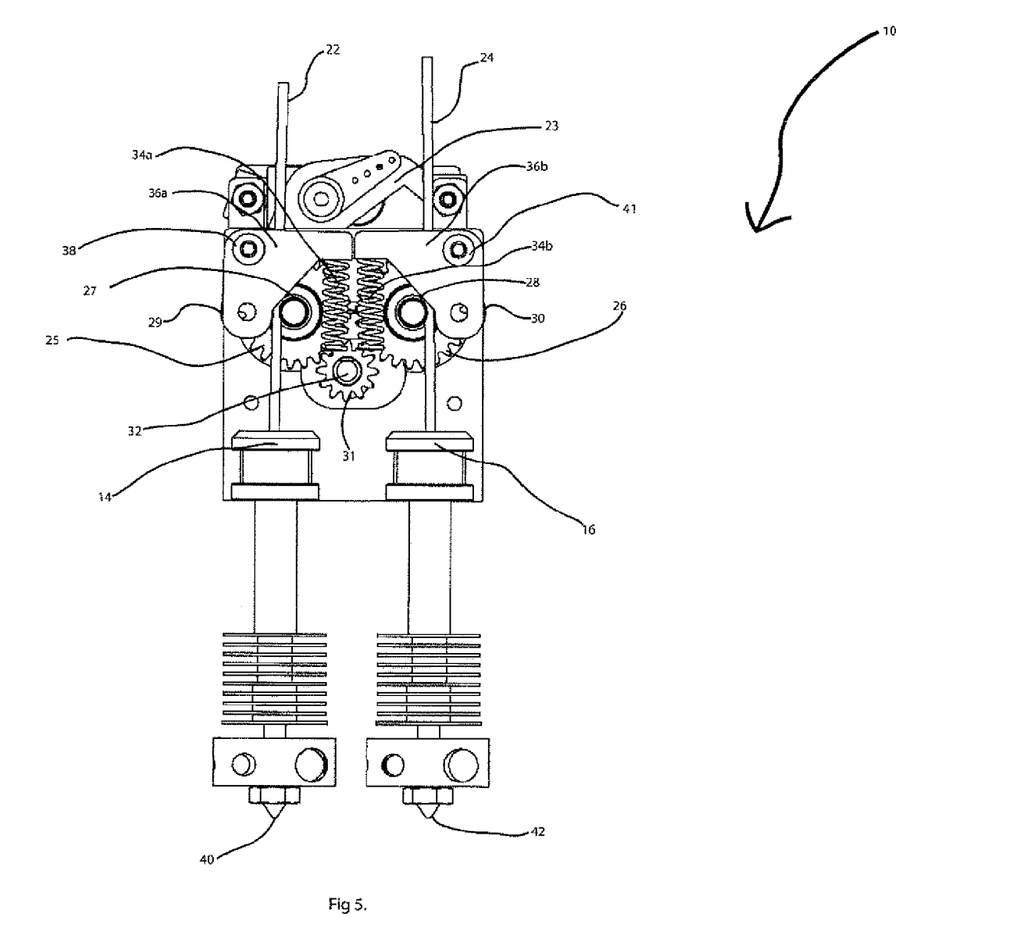
FIG. 5 is a front partial elevation view of the system in FIG. 2.
Figure 6:
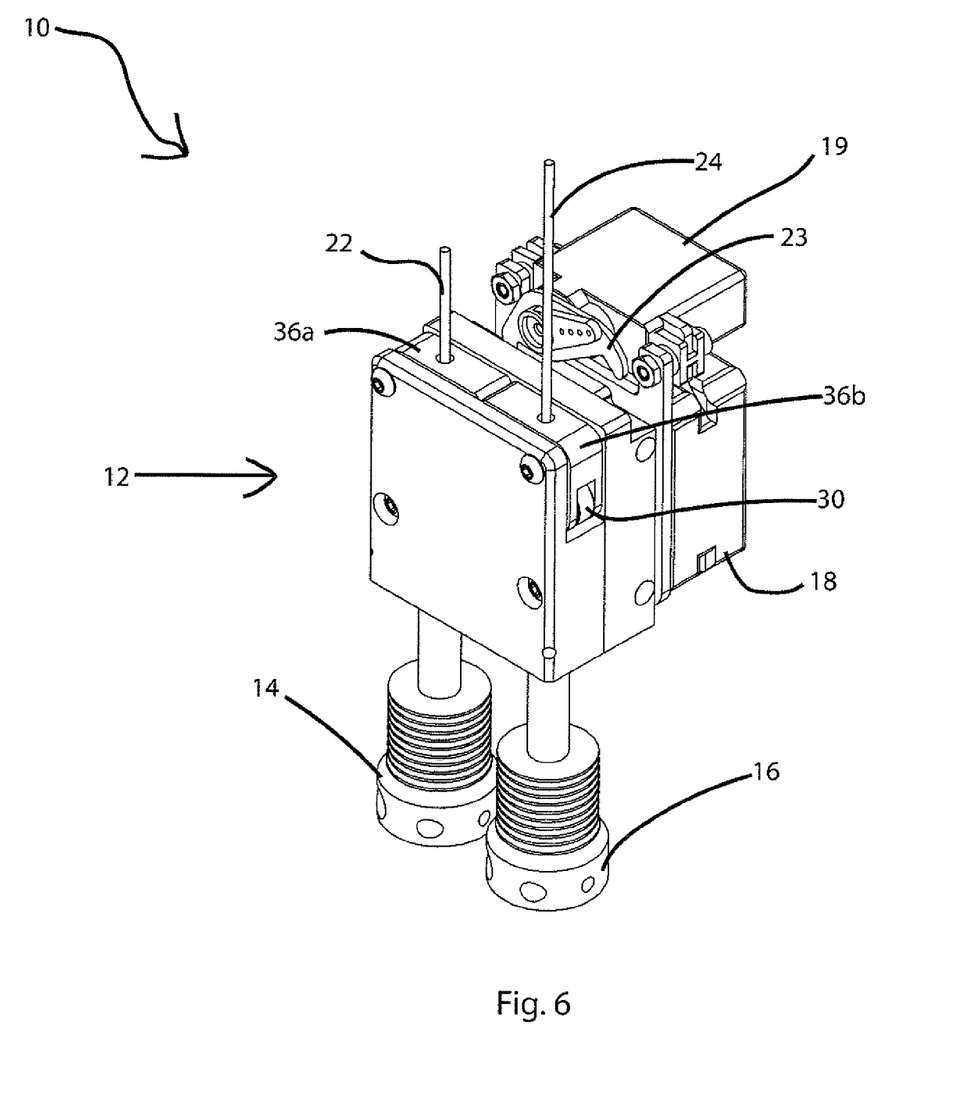
FIG. 6 is a front perspective view of FIG. 2, fully assembled.

The head assembly 12 further comprises, as best seen in FIG. 5 spring tensioners 34a, 34b and rockers 36a, 36b. The spring compressors 34a, 34b rotationally compresses the outer idler bearings 29, 30 about pivot points 38, 41 against filaments 22, 24 and fixedly attached inner idler gear shafts 27, 28. The drive gear 31, as the system 10 moves by the stepper motor 18 along the linear rail 20 rotates the idler gears 25 or 2,6 resulting in the extruding of thermoplastics through the filaments 22 or 24 through respective extruders 14, 16.

During operation, the system 10 uses the single motor 18 to drive the single drive gear 31 to advance material through multiple filaments 22, 24, through multiple extruders 14, 16 and the dispensing of material from their respective nozzles 40, 42 in a compact design. When filament feedstock 22, 24 (thermoplastic material) passes, between idler gear shafts 27, 28, and idler bearings 29, 30, sufficient rotational resistance is created by the tensioner 34 and rocker 36 to allow selection of the left 22 or right 24 filament by reversing the direction of the drive gear 31. That is, in one example embodiment, when the drive gear 31 is rotating clockwise, the left idler gears 25 is engaged and the left 22 filament is extruded from the extruder nozzle 40. Conversely, when the drive gear 31 is rotating counter clockwise, the right idler gear 26, is engaged and the right filament 24 is extruded from the extruder nozzle 42. This method of passive actuation by the system 10 advantageously allows for the extrusion head to be retrofitted to an existing 3D printer without reconfiguring the 3D printer CPU or electronic control system. Further description of this example embodiment is described in the attached appendix which is part of this application and incorporated herein by reference.

Figure 7:
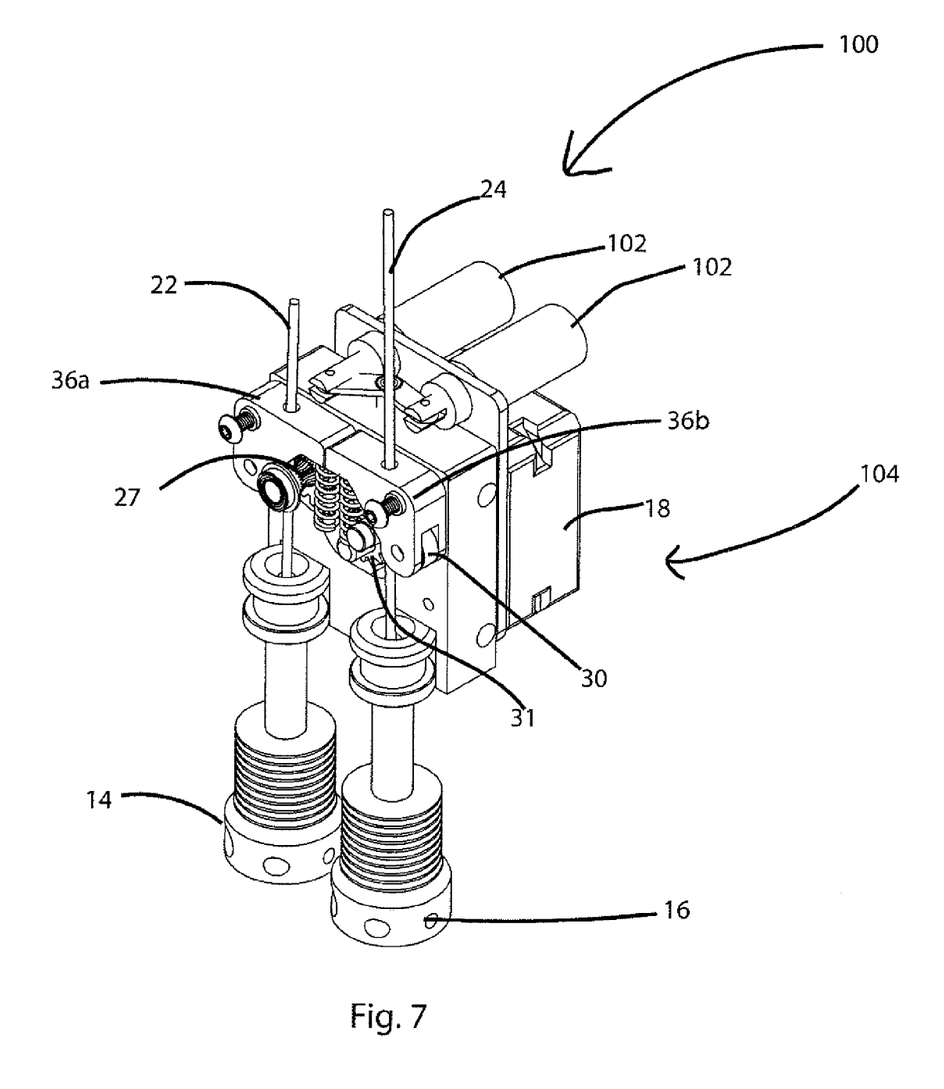
FIG. 7 is a front perspective view of an active FFF system constructed in accordance with one example embodiments of the present disclosure.
Figure 8:
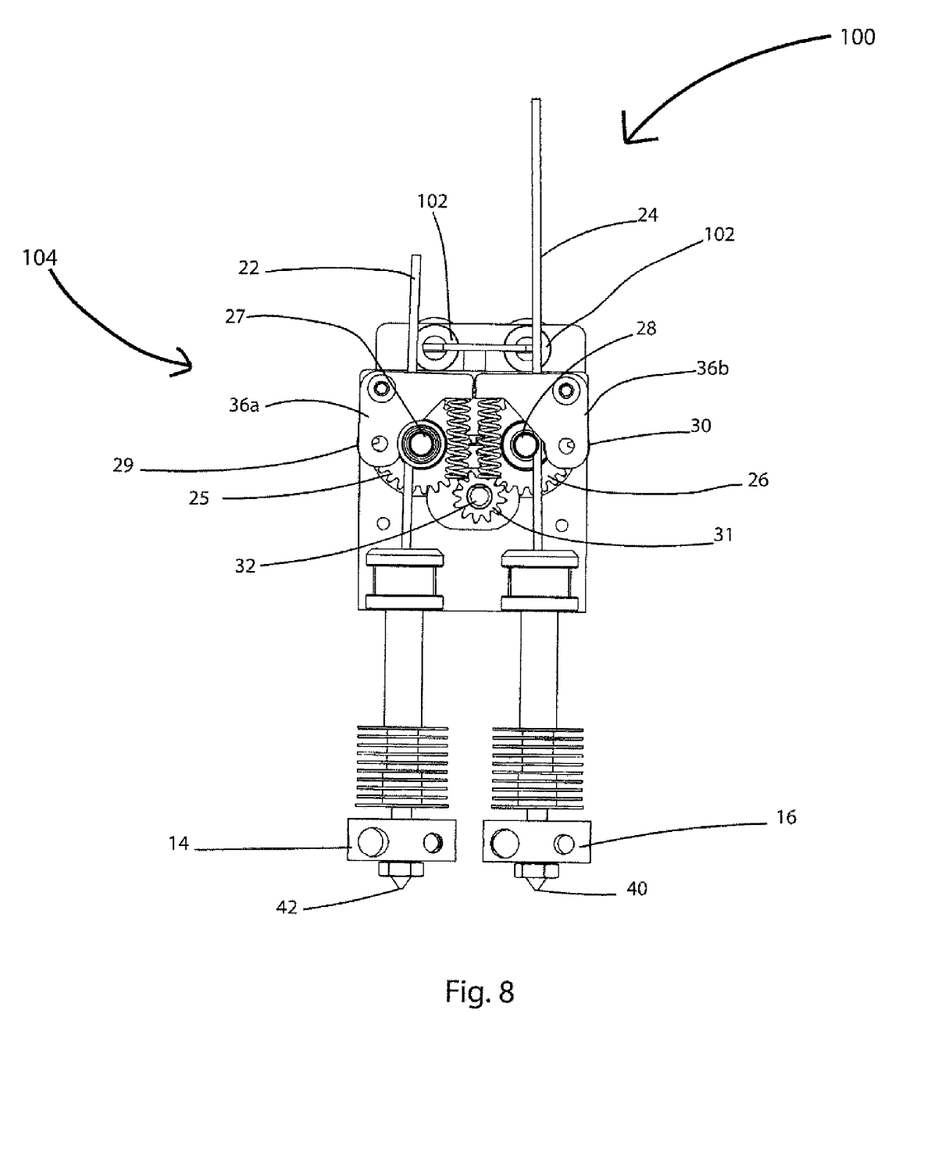
FIG. 8 is a front elevation view of the system in FIG. 7.

Illustrated in FIGS. 7 and 8 is an active FFF system 100 constructed in accordance with one example embodiments of the present disclosure. The system 100 comprises many of the features of the embodiment of FIGS. 2-6, however further comprises an actuation device 102 for power activation of the system for selection of filaments 22, 24 through idler gear shafts 27, 28, and idler bearings 29, 30 opposed to the use of the use of the direction of the drive gear 31.

In the example embodiment of FIGS. 7 and 8, the actuation device 102 shifts a filament drive frame 104 so that the drive gear 31 engages one of left idler gears 25 or right idler gears 26v to activate the respective filaments 22, 24, for the dispensing of material from the corresponding extruder nozzle 40, 42. In one example embodiment, the actuation device 102 is a servo motor, solenoid, or other similar method of powered actuation. Further description of this example embodiment is described in the attached appendix which is part of this application and incorporated herein by reference.

Both systems 10 and 100 allow for at least two nozzles 40, 42 to be operated from one motor and its corresponding drive gear 31. This advantageously reduces the footprint of the system 10, 100, allowing for double the footprint efficiency of conventional FFF designs.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A fused filament fabrication system comprising:
   a drive gear coupling to a motor during operation, the drive gear selectively operatively engaging first or second sets of idler gears during operation of the system; and
   first and second filaments for the selective passage of material to corresponding first and second extruders, the first filament being positioned between said first idler gear shaft and idler bearings and said second filament being positioned between said second idler gear shaft and idler bearings, wherein said selectively operatively engaging said first or second idler gears is achieved by changing the rotational direction of said drive gear.

2. The system of claim 1 wherein said selectively operatively engaging one of said first or second idler gears is achieved by an actuation device.

3. The system of claim 1 wherein the motor coupled to said drive gear provides both movement of the system along a linear rail and operable rotation of said drive gear.

4. The system of claim 1 further comprising a latch coupled to an actuation device which selectively allows the drive gear to remain engaged with said first or second idler gears during changing of rotational direction of said drive gear, to allow for filament retraction.

5. A fused filament fabrication system comprising:
- a drive gear coupling to a motor during operation, the drive gear selectively operatively engaging first or second idler gears during operation of the system;
- first and second filaments for the selective passage of material to corresponding first and second extruders, the first filament being positioned between said first idler gear shaft and a first idler bearing and said second filament being positioned between said second idler gear shaft and a second idler bearing; and
- said system during use dispensing material from said first filament when said first idler gear is engaged by said drive gear while said second filament remains free from dispensing, and said system during use dispensing material from said second filament when said second idler gear is engaged by said drive gear while the first filament remains free from dispensing, wherein said selectively operatively engaging one of said first or second idler gears is achieved by changing the rotational direction of said drive gear.

6. The system of claim 5 wherein said selectively operatively engaging one of said first or second idler gears is achieved by an actuation device.

7. The system of claim 5 wherein the motor coupled to said drive gear provides both movement of the system along a linear rail and operable rotation of said drive gear.

8. The system of claim 5 further comprising a latch coupled to an actuation device which selectively allows the drive gear to remain engaged with said first or second idler gears during changing of rotational direction of said drive gear, to allow for filament retraction.

9. A fused filament fabrication system comprising:
- a drive gear coupling to a motor during operation, the drive gear selectively operatively engaging first or second sets of idler gears during operation of the system, wherein said selectively operatively engaging said first or second idler gears is achieved by changing the rotational direction of said drive gear;
- first and second filaments for the selective passage of material to corresponding first and second extruders, the first filament being positioned between said first idler gear, a first idler shaft, and a first idler bearing and said second filament being positioned between second idler gear, a second idler shaft, and a second idler bearing;
- a latch coupled to an actuation device for selectively controlling the selective engagement and release of said first and second idler gears during the change of directional rotation of said drive gear such that retraction of material in said first and second filaments is controlled; and
- said system during use dispensing material from said first filament when said first idler gear is engaged by said drive gear while the said second filament remains free from dispensing, and said system during use dispensing material from said second filament when said second idler gear is engaged by said drive gear while the first filament remains free from dispensing.

10. The system of claim 9 wherein said selectively operatively engaging one of said first or second idler gears is achieved by an actuation device.

11. The system of claim 9 wherein the motor coupled to said drive gear provides both movement of the system along a linear rail and operable rotation of said drive gear.

12. A fused filament fabrication system comprising:
- a drive gear coupling to a motor during operation, the drive gear selectively operatively engaging a first set of idler gears responsive to a rotation of the drive gear in a first direction and a second set of idler gears responsive to the rotation of the drive gear in a second direction during operation of the system, wherein the first set of idler gears comprises a first idler gear and a first filament idler bearing and the second set of idler gears comprises a second idler gear and a second filament idler bearing; and
- first and second filaments for the selective passage of material to corresponding first and second extruders, the first filament being positioned between said first idler gear shaft and the first filament idler gear and said second filament being positioned between said second idler gear shaft and said second filament idler bearings.

13. The system of claim 12 wherein said selectively operatively engaging one of the first set of idler gears or the second set of idler gears is achieved by an actuation device.

14. The system of claim 12 further comprising the motor coupled to said drive gear, the motor providing movement of the system along a linear rail.

15. The system of claim 12 further comprising the motor coupled to said drive gear, the operably rotating said drive gear.

16. The system of claim 12 further comprising a latch coupled to an actuation device which selectively allows the drive gear to remain engaged with the first idler gear during a rotation of the drive in the second direction and remain engaged with the second idler gears during the rotation of said drive gear in the second direction, to allow for a retraction of the first filament.

17. The system of claim 12 further comprising a latch coupled to an actuation device which selectively allows the drive gear to remain engaged with the second idler gear during a rotation of the drive in the first direction and remain engaged with the first idler gears during the rotation of said drive gear in the first direction, to allow for a retraction of the second filament.

* * * * *